United States Patent [19]

Frosch et al.

[11] Patent Number: 5,492,571

[45] Date of Patent: Feb. 20, 1996

[54] THERMOMAGNETIC ENCODING METHOD AND ARTICLES

[75] Inventors: Robert A. Frosch, Boston, Mass.; Thomas A. Perry, Washington, Mich.; John R. Bradley, Clarkston, Mich.; Thaddeus Schroeder, Rochester Hills, Mich.; Bruno P. B. Lequesne, Troy, Mich.

[73] Assignee: General Motors Corporation, Detroit, Mich.

[21] Appl. No.: 140,956

[22] Filed: Oct. 25, 1993

Related U.S. Application Data

[63] Continuation-in-part of Ser. No. 788,662, Nov. 6, 1991, Pat. No. 5,283,130, and a continuation-in-part of Ser. No. 789,702, Nov. 8, 1991, and a continuation-in-part of Ser. No. 818,959, Jan. 10, 1992, abandoned, which is a continuation-in-part of Ser. No. 589,352, Sep. 28, 1990, Pat. No. 5,089,060, which is a continuation-in-part of Ser. No. 589,359, Sep. 28, 1990, Pat. No. 5,091,021.

[51] Int. Cl.⁶ .................................................... H01F 1/032
[52] U.S. Cl. ........................... 148/103; 148/101; 29/595
[58] Field of Search .................................. 148/101, 103; 29/595

[56] References Cited

U.S. PATENT DOCUMENTS 4,312,684   1/1982   Chraplyvy et al. ..................... 148/121

(List continued on next page.)

OTHER PUBLICATIONS

Magneto–Optical Storage Material, Frans J. A. M. Greidanus and W. Bas Zeper, MRS Bulletin, Apr., 1990; pp. 31–39.
Formation of Magnetic Grating on Steel Plates by Electron/Laser Beam Irradiation, IEEE Transactions on Magnetics, vol. 25, No. 5, Sep. 1989; pp. 3830–3832.
Hansen, "Magneto–Optical Recording Materials and Technologies", Journal of Magnetism and Magnetic Materials, vol. 83 (1990), pp. 6–12.
Herbst et al., "Laser Annealing and Selective Magnetization of Manganese–Aluminum Alloys", Appl. Phys. Lett., vol. 37, No. 8 (Oct. 15, 1980), pp. 753–754.
Kryder, "Advanced in Magneto–Optic Recording Technology", Journal of Magnetism and Magnetic Materials, vol. 83 (1990), pp. 1–5.
Lunney et al., "Enhanced Corrosion Resistance of $Fe_{40}Ni_{38}Mo_4B_{18}$ and $Nd_{15}Fe_{77}B_8$ by Laser Glazing", SPIE, vol. 1023 Excimer Lasers and Applications (1988), pp. 216–233.
Weller–Brophy et al., "Materials Challenges in Integrated Optical Recording Heads", MRS Bulletin, vol. XV, No. 4, (Apr. 1990), pp. 25–30.
Bradley et al., "Microstructure and Magnetic Properties of $CO_2$ Laser Surface Melted Nd–Fe–B Magnets", Journal of Magnetism and Magnetic Materials, vol. 86 (1990), pp. 44–50.
Croat et al., "Crystallization of Amorphous $Pr_{0.27}Co_{0.73}$: Magnetic Properties and Laser–Induced Coercivity", Appl. Phys. Lett., vol. 37, No. 10, (Nov. 15, 1980), pp. 962–964.
Gambino (editor), "Optical Storage Disk Technology", MRS Bulletin, vol. XV, No. 4 (Apr. 1990), pp. 20–22.

Primary Examiner—John Sheehan
Attorney, Agent, or Firm—Anthony Luke Simon

[57] ABSTRACT

An article comprising first and second bodies of permanent magnet material, each of said first and second bodies consisting substantially of a substrate of permanent magnet material being magnetized substantially uniformly to a predetermined flux density in a range from zero flux to 100% flux saturation of the permanent magnet material; each of the first and second bodies also comprising a pattern of at least one affected volume in a surface of the body, wherein each affected volume has a magnetic flux density that varies from the substantially uniform predetermined flux density and wherein the first and second bodies are stacked and fixedly attached so that the pattern on each body aligns with the pattern on the other body, wherein at least one affected volume on the first body is aligned with at least one affected volume on the second body and wherein the aligned affected volumes comprise a pole detectable by a magnetic sensor.

12 Claims, 5 Drawing Sheets

U.S. PATENT DOCUMENTS

| | | | |
|---|---|---|---|
| 4,347,086 | 8/1982 | Chraplyvy et al. | 148/101 |
| 4,438,362 | 3/1984 | Brown | 335/302 |
| 4,678,634 | 7/1987 | Tawara et al. | 335/302 |
| 4,835,505 | 5/1989 | Hattori et al. | 335/302 |
| 4,857,786 | 8/1989 | Nehei et al. | 335/302 |
| 5,089,060 | 2/1992 | Bradley et al. | 148/103 |
| 5,091,021 | 2/1992 | Perry et al. | 148/103 |

THERMOMAGNETIC ENCODING METHOD AND ARTICLES

This application is a continuation-in-part application of pending U.S. patent applications, Ser. Nos. 07/788,662, filed Nov. 6, 1991, now U.S. Pat. No. 5,283,130, 07/789,702, filed Nov. 8, 1991 and 07/818,959, filed Jan. 10, 1992, now abandoned, which is a continuation-in-part of application Ser. No. 07/589,352, filed Sep. 28, 1990, now U.S. Pat. No. 5,089,060 and is a continuation-in-part of Ser. No. 07/589,359, filed Sep. 28, 1990, now U.S. Pat. No. 5,091,021, all of which are assigned to the assignee of this invention. The disclosures of the above Ser. Nos. 07/788,622, 07/789,702, 07/818,959, 07/589,352 and 07/589,359 are all incorporated herein by reference.

This invention relates to a method of forming a magnetically coded pattern in a permanent magnet material and the resulting article.

BACKGROUND OF THE INVENTION

In automotive and other industrial applications, special sensors are used to determine shaft speed and angular position, for example, as well as linear motion sensing. Generally, such sensors are either of the variable reluctance variety or comprise a toothed steel wheel (i.e., exciter) spaced from a sensor comprising a magnet and a magnetoresistor or a Hall effect device. Other types of sensors require multi-bit digital encoding for position sensing and other uses.

A permanent magnet with an appropriate magnetization pattern can serve as the exciter component of a magnetoresistive sensor without the need for a separate bias magnet. However, by conventional production methods currently in use, very small magnetic exciters could not be magnetized with a pattern providing the necessary combination of resolution and field strength and the cost of a large permanent magnet exciter would be prohibitive. If several different magnetization patterns were desired side-by-side, such as for multi-digital encoding, more complex manufacturing problems arise; either machining or magnetizing such an exciter as one unit is very costly and is seldom done.

SUMMARY OF THE INVENTION

In the above-described parent applications and patents, a solution to this problem is set forth that provides a thermomagnetic method of producing magnets with patterned magnetic fields readable by a magnetic sensor at a practical and relatively dense spacing and capable of providing a small, low-cost magnet with narrow, closely spaced poles. This solution allows the production of digital patterns as well as analog patterns having gradually varying field strength in magnets.

In one example described in patent application 07/818,959, referred to above, the method of imparting a magnetic pattern onto a magnetized permanent magnetic bulk material comprises the steps of: directing energy in a pattern onto base permanent magnetic bulk material to heat a volume of the material to a threshold temperature to lower the coercivity thereof; imposing a magnetic field on the heated pattern greater or stronger than a coercivity of the heated volume, wherein the field imposed on the heated pattern emanates at least partially from the magnetized base material, whereby the treated pattern generates a flux density lower or higher than the base material; and allowing the material to cool in the imposed field, whereby the treated material has a magnetic characteristic sufficiently different from the base material to be readily detected by a magnetic sensor.

In the case of a previously magnetically saturated magnetic body, a lower flux density arises because the field to which the heated region is exposed emanates from unheated portions of the magnetic body. This effect can be enhanced by an external imposed field, which increases the strength or flux density. In the case of a magnetic body that is not magnetically saturated, an imposed field of either polarity provides regions of different strength and/or polarity. Thus, a desired magnetic characteristic such as orientation polarity, flux density or strength can be provided at regions of a magnetic body in any desired pattern.

In another example described in parent application 07/818,959, imparting a magnetic pattern to an unmagnetized permanent magnet bulk material may be carried out by the steps of: directing energy in a pattern onto unmagnetized base permanent magnet bulk material to heat a volume of the material to a threshold temperature to lower the coercivity thereof; selectively magnetizing the heated pattern by imposing on the pattern a magnetic field stronger than the coercivity of the heated volume and not strong enough to significantly magnetize the unheated material; and allowing the material to cool in said magnetic field, whereby the treated pattern generates a magnetic flux density that is readily detected by a magnetic sensor.

Through the above described processes for the manufacture of magnetic exciters, it is typically desirable to create the exciters with a strong magnetic field emanating from the surface of the exciter and also having closely spaced poles. Such a result provides stronger fields to be detected by a sensor and increased density of magnetic poles, allowing for a higher information density or a higher resolution exciter. According to the above methods, however, the two properties of magnetic field strength and pole density have been, to a certain extent, mutually exclusive.

Advantageously, this invention describes a new method of making magnetically encoded articles that allows for an increase in both the properties of strength of magnetic field emanating from the surface of the encoded article and the density of the magnetic poles encoded in the article. Advantageously, this invention provides an alternative to working with a thick body by working with thinner bodies including bodies that may be laminated together. Advantageously, this invention recognizes that a magnetic pole in an encoded article has an increased magnetic field strength as the depth of the pole in the encoded article increases.

Advantageously, this invention recognizes that heat flow patterns through an article to be encoded expands spherically so that as more heat is provided to the article, the width of the affected zone increases, which detracts from pole density and sensor resolution. Advantageously, this invention allows for both increased depth of a magnetically affected zone forming a pole in the encoded article while, at the same time, limiting the width of the heat affected zone. This advantageous structure thereby provides higher magnetic field strength at each pole while also allowing for increased density of poles and increased resolution of the magnetically encoded article.

According to this invention, it is recognized that the magnetically encoded articles may comprise a magnetic material in which regions are formed having flux densities that vary from the flux density of the remainder of the material, which regions are referred to as poles according to this invention. It is also recognized that this invention applies to magnetically encoded articles comprising unmagnetized material with heat affected zones that form magnetized regions, which are also referred to as poles according to this invention.

Advantageously, in one embodiment this invention provides a method for forming an article with a magnetic pattern thereon, comprising the steps of: (a) directing energy in a pattern onto a first base of permanent magnet material to heat a volume (zone) of the material to a threshold temperature to lower the coercivity thereof, the first base of permanent magnet material having a permanent magnetic field flux density value in a range from zero flux to a flux density of 100% saturation of the first base of permanent magnet material; (b) imposing a magnetic field on the heated volume greater or stronger than the coercivity of the heated volume, wherein the heated volume generates a flux density lower or higher than that of the first base of permanent magnet material; (c) allowing the heated volume to cool in the imposed field, whereby the heated and cooled volume has a magnetic characteristic sufficiently different from the first base of permanent magnet material and comprises at least one pole that is readily detected by a magnetic sensor, (d) repeating steps (a), (b) and (c) on a second base of permanent magnet material, and (e) stacking and attaching the two bases of permanent magnet materials so that at least one heat affected volume of each base of permanent magnet material aligns with at least one heat affected volume of the other base of permanent magnet material, improving the detectability of said one pole by said magnetic sensor. It is recognized that the applied magnetic field is stronger than the coercivity of the heated volume and not strong enough to significantly affect the level of magnetization (which may be 0 to 100% saturation) of the unheated material. Furthermore, steps (d) and (e) may be repeated for additional bases of permanent magnet material to form an article comprising a stack of three or more bases of permanent magnet material.

It is recognized that the above method may be carried out on an unmagnetized base of permanent magnet material (flux density~0), on a magnetically saturated base of permanent magnet material (flux density~100% saturation) or on an unsaturated magnetized base of permanent magnet material (0<flux density<100% saturation).

When the base material started with is magnetized (flux density>0) and the heat affected zone is placed in the presence of the applied magnetic field, the applied magnetic field either adds to or subtracts from the field emanating from the magnetized base material to create poles at the heat affected zones that can be readily detected by a magnetic sensor. That is, the flux density at the heat affected zone is either greater than or less than the flux density of the base material, which remains substantially unaffected by the applied magnetic field.

When the base material started with is unmagnetized (flux density~0), the above method creates magnetic poles in the otherwise unmagnetized base material. These magnetic poles may be either North or South and or may be of varying strengths and can be readily detected by a magnetic sensor.

The method of this invention may be implemented to increase pole flux density in an encoded article without increasing a width of the pole, which is the width of the heat affected zone. Alternatively, the method may be implemented to increase density of poles (number of poles per unit area), without decreasing pole strength by making smaller heat affected zones on each of the base materials.

It is recognized that in the processes described herein, for each set of two or more corresponding heat affected volumes that are aligned, the volumes are aligned so that the magnetic pole vectors of each volume are coplanar with the other corresponding volumes and have substantially parallel magnetic vectors with those of the other corresponding volumes.

In one embodiment, the slabs are flat and stacked and the number of stacked slabs may be two or more. It is recognized that the preferred method of fastening the first and second (and third, etc.) slabs together is carried out by laminating the first and second slabs together.

Alternatively, the slabs may be cylindrical or irregular in shape and stacked, such as in the case of cylinders fitting within each other and laminated or otherwise suitably attached together with their heat affected volumes aligned to increase pole strength without decreasing density capability.

Advantageously, this invention provides a method for forming an article with a magnetic pattern on two sides to provide increased magnetic pole strength comprises the steps of: (a) directing energy in a pattern onto a first side of a base permanent magnet material to heat a volume of the material to a threshold temperature to lower the coercivity thereof, the base permanent magnet material having a permanent magnetic field flux density value in a range from zero flux to a flux density of 100% saturation of the base permanent magnet material; (b) imposing a magnetic field on the heated volume greater or stronger than a coercivity of the heated volume, wherein the heated volume generates a flux density lower or higher than the base material; (c) and allowing the material to cool in the imposed field, whereby the heated and cooled volume has a magnetic characteristic sufficiently different from the base material and comprises at least one pole that is readily detectable by a magnetic sensor, (d) repeating steps (a), (b) and (c) on a second side of the base permanent magnet material, wherein the pattern on the first side of the material corresponds to the pattern on the second side of the material, improving the detectability at least of said one pole by the magnetic sensor.

It is recognized that, according to this invention, the above steps for creating the first and second volumes on the first and second sides of the base material may be carried out either concurrently, with both sides being treated at the same time, or sequentially, with one side being treated, then the other side being treated.

In yet another embodiment of this invention, a magnetically encoded article is created on a relatively thin unmagnetized permanent magnet material by the steps of: (a) directing energy in a pattern onto a first side of a first base of permanent magnet material to heat a volume of the material to a threshold temperature to lower the coercivity thereof, the first base of permanent magnet material having a permanent magnetic field flux density value in a range from zero flux to a flux density of 100% saturation of the first base of permanent magnet material; (b) imposing a magnetic field on the heated volume greater or stronger than a coercivity of the heated volume, wherein the heated volume generates a flux density lower or higher than the base material; (c) allowing the material to cool in the imposed field, whereby the heated and cooled volume has a magnetic characteristic sufficiently different from the base material and comprises at least one pole that is readily detectable by a magnetic sensor, (d) repeating steps (a), (b) and (c) on a second side of the first base of permanent magnet material, wherein the pattern on the first side of the material corresponds to the pattern on the second side of the material, improving the detectability at least of said one pole by the magnetic sensor; (e) repeating steps (a)–(d) on a second bases of permanent magnet material to form a second magnetic pole; (f) stacking and fastening the first and second bases of permanent magnet material together with the first and second poles aligned, providing increased magnetic flux strength without increasing a width of the heat affected zone.

One embodiment of the article of this invention comprises a magnet comprising first and second bodies of permanent magnet material, each of said first and second bodies consisting substantially of a substrate of permanent magnet material being magnetized substantially uniformly to a predetermined flux density in a range from zero flux to 100% flux saturation of the permanent magnet material; each of the first and second bodies also comprising a pattern of at least one affected volume in a surface of the body, wherein each affected volume has a magnetic flux density that varies from the substantially uniform predetermined flux density and wherein the first and second bodies are stacked and fixedly attached so that the pattern on each body aligns with the pattern on the other body, wherein at least one affected volume on the first body is aligned with at least one affected volume on the second body and wherein the aligned affected volumes comprise a pole detectable by a magnetic sensor.

Another embodiment of the article of this invention comprises a magnet comprising a body of permanent magnet material, said body consisting substantially of a substrate of permanent magnet material being magnetized substantially uniformly to a predetermined flux density value in a range from zero to 100% saturation of the permanent magnet material; said body also comprising a first pattern of one or more affected first volumes in a first surface of the body and a second pattern of one or more affected second volumes in a second surface of the body opposite the first surface, wherein at least one of each of the first and second volumes are directly opposite each other, wherein each affected first and second volumes has a magnetic flux density that varies from the substantially uniform predetermined flux density of said substrate and wherein said first and second volumes comprise magnetic poles aligned with each other.

In yet another embodiment, the article of this invention comprises two or more bodies of permanent magnet material, each having first and second sides with first and second affected volumes forming poles as described in the above embodiment, wherein the two or more bodies are stacked and fastened together so that at least one pole on one body aligns with at least one pole on the other body or bodies.

Advantageously, each of the above-described articles of this invention comprises a generic structure in which heat affected volumes are aligned in a direction perpendicular to a plane tangential to the surface of the article at the magnetic pole to provide increased pole magnetic field strength relative to the substantially uniform magnetic field of the body without sacrificing pole density. In a generic structure, the article of this invention comprises a body of permanent magnet material consisting substantially of a substrate of permanent magnet material being magnetized substantially uniformly to a predetermined flux density in a range from zero flux to 100% flux saturation of the permanent magnet material; the body also comprising a pattern of at least one affected first volume in a surface of the body, and at least one affected second volume aligned with one of the affected first volumes in a direction substantially perpendicular to a plane tangential to said surface of the body, wherein each affected first and second volume has a magnetic flux density that varies from the substantially uniform predetermined flux density and wherein the aligned affected first and second volumes comprise a pole detectable by a magnetic sensor.

A more detailed description of this invention along with various embodiments thereof is set forth below.

DETAILED DESCRIPTION OF THE INVENTION

An unmagnetized permanent magnet body is thermomagnetically encoded by heating selected portions (regions) of the body in a magnetic field and maintaining the field while the heated selected regions cool. The magnetic field is too weak to permanently magnetized the unheated portions (unselected regions) of the unmagnetized body. The direction of the applied magnetic field can be readily reversed from one heated region of the body to the next. Thus, the polarity of the magnetized regions can be varied in any desired sequence to perform any desired pattern in an unmagnetized permanent magnet body. The basic method is also applied to form any desired pattern in a previously magnetized permanent magnet body.

In the case of a magnetized permanent magnet body, the region of the body heated above a selected temperature is paramagnetic and becomes the location for the preferred return path for the magnetic flux emanating from adjacent unheated (unselected regions) of the permanent magnet body. Upon cooling, the heated selected regions are partially remagnetized in the reversed return path field imposed by either the unselected regions and external field or both. Preferably, heating is done with a laser beam.

With both initially magnetized and unmagnetized permanent magnet bodies, thermomagnetic encoding exploits the temperature dependence of the coercivity of the magnet. Coercivity decreases with increasing temperature. Thus, remanent magnetization is established in the selected regions of the body in which heating is sufficient for the applied magnetic field to exceed the coercivity. This is described in U.S. Pat. Nos. 5,089,060 and 5,091,021 referred to above.

The magnetization of thin slabs or films of permanent magnet bodies according to this invention generally takes place on films on the order of 1 mm and thinner for stacked slabs treated on one side. However, with proper depth of the heat affected zone, films or slabs substantially greater than 1 mm thickness may be used. For two sided treatment of slabs, the permanent magnet bodies according to this invention are generally 2 mm and thinner. However, as above, larger thicknesses may be used.

Various permanent magnet bodies may be used as the starting material for this invention. The basic method as set forth in the above parent applications has been successfully used on ferrites, alnico materials and Magnequench (TM) materials.

Preferably, in the case where an unmagnetized body is to be patterned, the permanent magnet material has a strong coercivity dependence on temperature so that local regions can be heated and magnetized without magnetizing the surrounding bulk material. Generally, the coercivity decreases as the temperature increases until the Curie temperature is attained. The temperature required for the process depends on the strength of the magnetizing field. There are some magnetic alloys, however, which exhibit a more complicated magnetic behavior as a function of temperature and heating to a temperature below the Curie point is sufficient to effect a magnetic change. That is, other materials may undergo structural changes below the Curie temperature which change their properties and magnetic characteristics. For example, $Nd_2Co_{14}B$ exhibits a spin reorientation phase transition at a temperature $T_s$. Below $T_s$, such materials exhibit an axial easy direction. Above $T_s$, the moments will rotate freely in the basal plane. Thus, the Curie temperature need not be reached to apply the patterning process to either type of material.

The materials MQ1 and MQ2 are NdFeB-based alloys having a high energy product and are trademarked products of General Motors Corporation. The U.S. Pat. No. 4,792,367 to Lee, assigned to the assignee of this application, discloses the MQ2 material, which is a rare earth-iron-boron based alloy that may include other suitable alloy constituents such as cobalt. The preferred methods of forming permanent magnets from that material include over-quenching a multi-mixture of the precursors by melt spinning to obtain an amorphous or very finely crystalline material having little intrinsic coercivity and then hot pressing to promote crystal growth to the optimum size for the desired hard magnetic properties. Alternatively, the material is hot pressed and hot worked to form the desired fine grain to the recrystallized microstructure consisting mainly of an $Nd_2Co_{14}B$-type phase. An intrinsic room temperature coercivity exceeding 15 kOe (thousands of oersteds) is obtained along with very high remanence and high energy product. MQ1 magnets are made of a powdered form of a similar annealed material held together by epoxy bonding.

The basic method of patterning will be first described. This is also described in U.S. Pat. Nos. 5,089,060 and 5,091,021, assigned to the assignee of this invention. The basic method is carried out by imparting a magnetic pattern to an unmagnetized permanent magnet material by the steps of directing energy in a pattern onto unmagnetized base permanent magnet material (body) to heat a volume of the material to a threshold temperature to lower the coercivity thereof, selectively magnetizing the heated pattern by imposing on the pattern a magnetic field stronger than the coercivity of the heated volume and not strong enough to significantly magnetize the unheated material and allowing the material to cool in the magnetic field whereby the treated pattern generates a magnetic flux density that is readily detected by a magnetic sensor.

The method of patterning an unmagnetized permanent magnet body is exemplified by a permanent magnet of any shape. For example, a plate, disc or annulus. This is exemplified in FIG. 1 as a flat plate, base or substrate 10 of unmagnetized or demagnetized permanent magnet material having outer surface 11 including an upper surface 12 and a lower surface 14. The substrate 10 is placed in a magnetic field 16 with either the upper or lower surface oriented so as to be exposed to an energy source 17, which produces energy in a form such as a laser beam 18. The laser beam 18 is then used to impinge on the surface 12 in a pattern to heat a selected region or volume 20 in which the coercivity is lowered from that of the bulk material to a value below the field strength. The magnet field magnetizes the heated volume as it cools and regains its coercivity. Thus, the pattern becomes a permanent magnet. The direction of the magnetic field determines the polarity of the magnet and by changing the field direction, different parts of the pattern can have different polarities. In this way, it is possible to write a grating or other pattern of enhanced magnetic field strength regions on the surface of the body 10 without altering the microstructure of the material.

It should be noted that when a pattern of enhanced field strength is generated at a temperature below the Curie temperature, the applied external field strength must be large to get a high degree of polarization of the region. This strong applied external field will also tend to increase alignment of the moment in the unselected non-heat affected zones of the substrate. To achieve maximum contrast, it is necessary to use a moderate field strength at a pattern temperature above the Curie point.

To impart a magnetic pattern to a magnetized permanent magnet material, steps followed as described in U.S. Pat. No. 5,089,060 include: directing energy in a pattern onto base permanent magnet material to heat a volume of the material to a threshold temperature to lower to the coercivity thereof; imposing a magnetic field on the heated pattern greater than the coercivity of the heated volume, wherein the field imposed on the heated pattern emanates at least partially from the magnetized base material, whereby the treated pattern generates a lower or higher flux density than the base material; and allowing the material to cool in the imposed field, whereby the treated pattern has a magnetic characteristic sufficiently different from the base material to be readily detected by a magnetic sensor.

The method of patterning a permanent magnet material to obtain increased pole field strength (flux density) and/or increased pole density (number of poles per unit area) will now be described.

Figures 1, 2:
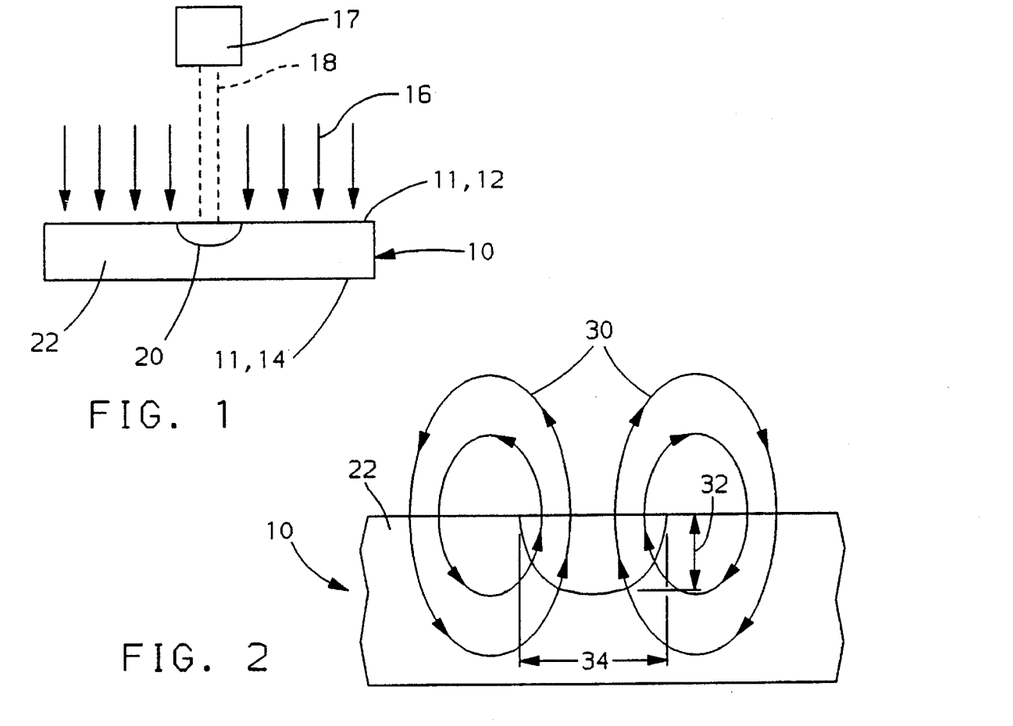
FIG. 1 is a schematic view of a body being magnetically patterned by a process according to the invention.
FIG. 2 illustrates a heat affected volume of a magnetically patterned body.

A property utilized according to this invention is a trend followed that the magnetic field strength at a small distance above the magnetized zone increases monotonically as the depth of the magnetized zone is increased. FIG. 2 illustrates a simplified model of the geometry of the heat affected region 20 within the unmagnetized or unaffected region 22 and the body 10. The approximate relation between the B and H fields or the geometry shown in the Figure, may be described by the equation:

$$B_{ave}(l+L) = \mu_o H_c l, \qquad (1)$$

where L is the path length external to the zone, $\mu_o$ is the permittivity of air, $H_c$ is the coercivity of the magnet and l is the depth of the zone. The above equation illustrates that the magnetic field emanating from the surface, $B_{ave}$, increases as the length l increases, particularly if l is relatively small as is usually the case with magnetically coded articles according to this invention.

In FIG. 2, the affected volume 20 has a width 34 and depth 32 (l) that is approximately one-half the width 34, as will be explained in more detail below.

Figure 3:
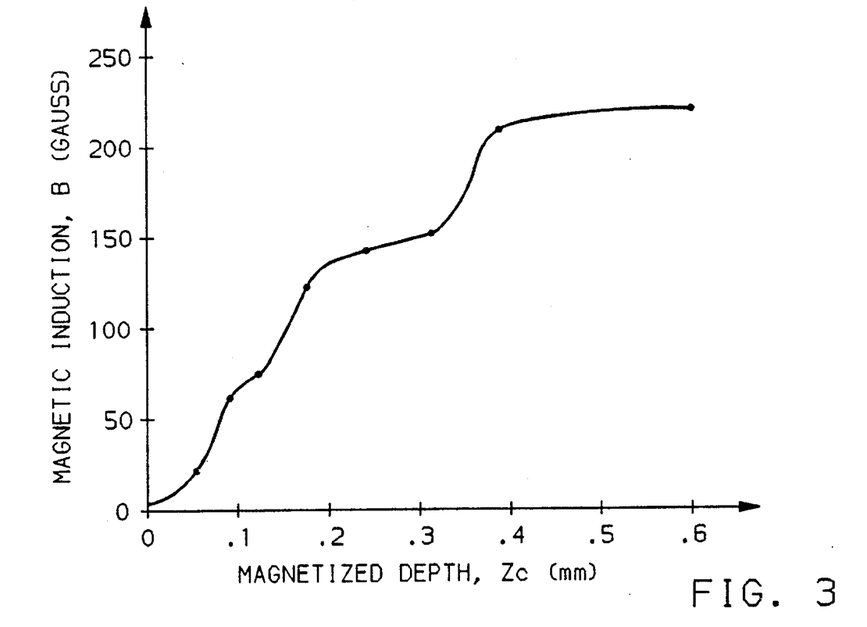
FIG. 3 is a graph illustrating the strength of a magnetic field versus the depth of the magnetized volume.

Referring to FIG. 3, the plot shown graphs experimental results that verify the model Equation (1) above and the conclusion that as 1 (reference 32) increases, so does the magnetic field emanating from the surface of the affected volume 20.

The plot in FIG. 3 was determined as follows. A series of magnetized zones of varying depths was created on otherwise unmagnetized magnets by varying the incident laser power in the magnetic encoding process described above. The resultant field strength was measured 0.3 mm above each zone. The samples were then cross-section and decorated with magnetite particles so that the depth of the magnetic region could be measured from a photomicrograph. This data forms the graph in FIG. 3 where the increasing magnetic field signal as a function of increasing depth, l, reference 32 (FIG. 2), is clearly evident. To avoid the effects of the lateral extent of the deeper zones, the magnetic field was sensed using a sensor at least 20% smaller than the heat affected zone and placed close enough to the surface so that the influence of field from the edges of the zone was minimal.

As illustrated in FIG. 2, the heat affected zone and the magnetized volume 20 for common processing conditions is well approximated by a half-sphere or, for line segments, by a half-cylinder of radius l, reference 32.

Figure 4:
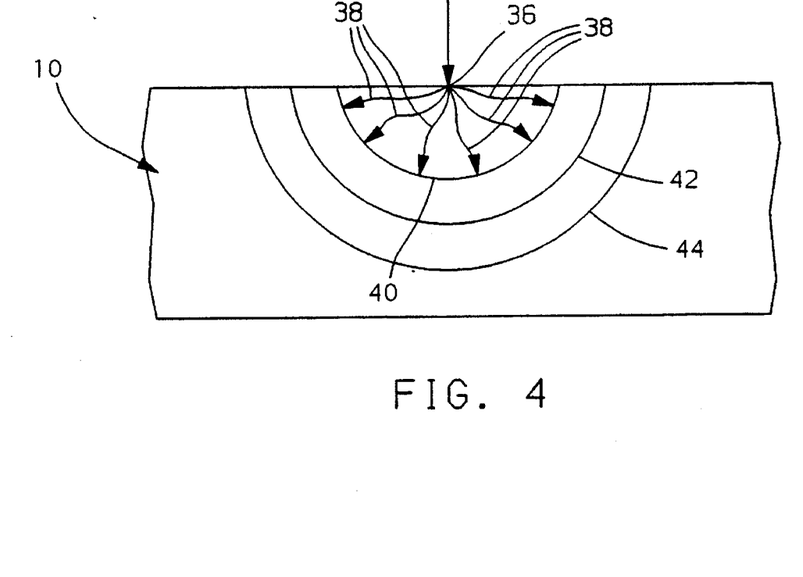
FIG. 4 illustrates heat propagation in a body.

Referring to FIG. 4, for a body 10 having a point 36 of heat impingement, the growth of a heat affected zone, illustrated by the lines 38 representing the propagation of heat and the peripheries 40, 42 and 44 representing the extent of the heat affected zone, is determined by the amount of heat supplied to point 36. Since the peripheries 40, 42 and 44 simplify as a half-circle, the heat affected zone is approximately twice as wide as it is deep. The width to depth ratio of the zone forming the magnetic pole is approximately 2. To increase the affected zone depth, as required to strengthen the field near the surface according to Equation (1), thus, also would result in a widened width 34 for the heat affected volumes. The increase of width in the heat affected volume 20, in turn, affects how close the heat affected volumes can be relative to one another, placing limitations on pole density and resolution of magnetically encoded articles according to the encoding process. Thus, signal strength from each pole is inversely proportional to the density of information of the target.

In many applications, it is preferred to have targets with both a high density of information and a strong signal strength. Thus a smaller width to depth ratio of the heat affected zone or pole is desired. This invention provides improvements to achieve this result.

EXAMPLE 1

In a first embodiment of the method according to this invention, instead of working with a thick permanent magnet body, the desired magnetic zone shape is achieved by laminating two or more thin properly encoded pieces together. The pieces are encoded according to the method described above and are encoded with identical patterns. The two or more thin pieces are then aligned and laminated together so that, while the width of the magnetized zones does not increase, the length or depth of the zones does increase, increasing the field strength without detracting from the resolution or pole density capabilities.

Thus, the method of this invention for forming an article with a magnetic pattern thereon comprises the steps of: (a) directing energy in a pattern onto a first base of permanent magnet material to heat a volume of the material to a threshold temperature to lower the coercivity thereof, the first base of permanent magnet material having a permanent magnetic field flux density value in a range from zero flux to a flux density of 100% saturation of the first base of permanent magnet material; (b) imposing a magnetic field on the heated volume greater or stronger than a coercivity of the heated volume, wherein the heated volume generates a flux density lower or higher than the first base of permanent magnet material; (c) allowing the heated volume to cool in the imposed field, whereby the heated and cooled material has a magnetic characteristic sufficiently different from the base material to be readily detected by a magnetic sensor, (d) repeating steps (a), (b) and (c) on a second base of permanent magnet material, and (e) stacking and attaching the two bases of permanent magnet materials so that at least one of the heat affected volumes of each base of permanent magnet material aligns with at least one of the heat affected volumes of the other base permanent magnet material. Furthermore, steps (d) and (e) may be repeated for additional bases of permanent magnet material to achieve a stack of three or more bases of permanent magnet material.

Through carrying out the above method steps of this invention, two or more heat affected zones in different base materials are aligned so that the magnetic vectors of the zones are collinear or, for line affected zones, the vectors are both collinear and coplanar. This increases the effective depth of the resultant poles on the magnetic article, thereby increasing pole field strength with no increase in pole width. Alternatively, if pole field strength need not be increased, the above method may be implemented, creating heat affected volumes of smaller size, allowing increased pole density while maintaining, through the stacking of multiple bases of magnetic material, pole field strengths at the desired levels.

In implementing the method according to this invention, the extent of the magnetized zone for reasonable processing conditions is a half sphere or half cylinder with a radius in the approximate range of 0.25–0.5 mm. If the thickness of each permanent magnet body is equal to or less than the radius of the half sphere or half cylinder of the magnetized zone, then the entire thickness of the body is magnetized, with the heat affected volume maintaining a small lateral extent, i.e., in the range of 0.5–1 mm. This is desirable. By creating two or more similar parts and laminating or otherwise stacking the two or more parts together with the magnetic patterns aligned, the result is a magnetic pole that is twice (thrice, etc.) as deep as each individual zone in each part without an increase in the lateral extent or width of the pole.

Thus the article of this invention according to this example comprises a magnet comprising first and second bodies of permanent magnet material, each of said first and second bodies consisting substantially of a substrate of permanent magnet material being magnetized substantially uniformly to a predetermined flux density in a range from zero flux to 100% flux saturation of the permanent magnet material; each of the first and second bodies also comprising a pattern of at least one affected volume in a surface of the body, wherein each affected volume has a magnetic flux density that varies from the substantially uniform predetermined flux density and wherein the first and second bodies are stacked and fixedly attached so that the pattern on each body aligns with the pattern on the other body, wherein at least one affected volume on the first body is aligned with at least one affected volume on the second body and wherein the aligned affected volumes comprise a pole detectable by a magnetic sensor.

Figure 5:
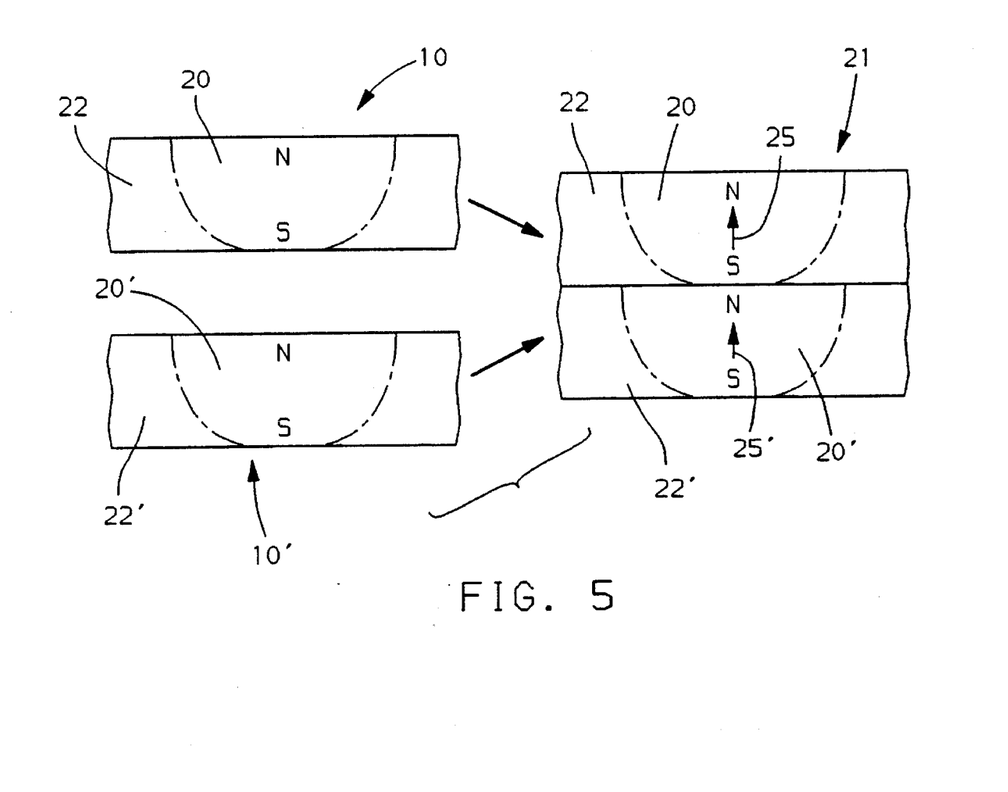
FIG. 5 illustrates an example implementation of the method and article of this invention.

Referring to FIG. 5, a first thin body 10 or film of permanent magnet material has at least one heat affected zone 20 carrying a magnetic flux greater or less than the magnetic flux in the remaining material 22 of the body 10, with the possible exception of other heat affected zones 20 that may be present in the body 10. A second thin body 10' or film of permanent magnet material also has a heat affected zone 20' carrying a magnetic flux greater or less than the magnetic flux in the remaining material 22' of body 10', also with the possible exception of other heat affected zones 20 that may be present in the body 10'. The pattern of the heat affected zone(s) 20 in body 10 is preferably substantially identical to the pattern of the heat affected zone(s) 20' in body 10'.

The two bodies 10, 10' are laminated or otherwise stacked and retained together with the two heat affected zones 20, 20' aligned as shown. With the zones 20, 20' aligned, the magnetic vectors, indicated by reference 25, 25' of the zones 20 and 20' are substantially collinear or, in the event that the heat affected zones 20, 20' are line segments, the magnetic field vectors 25, 25' for each zone form a plane, and the planes for the two zones 20, 20' are coplanar. The resultant magnetic pole 21 comprising the regions 20 and 20' has a width equal to the width of each magnetized zone 20 and 20' and a magnetized zone depth twice that of the depth of each body 10 and 10'.

The resultant laminated article comprising two slabs of permanent magnet material may have a pole width to depth ratio of 1 and the width to depth ratio may be even lower with more slabs in the resultant laminated article.

Figure 6:
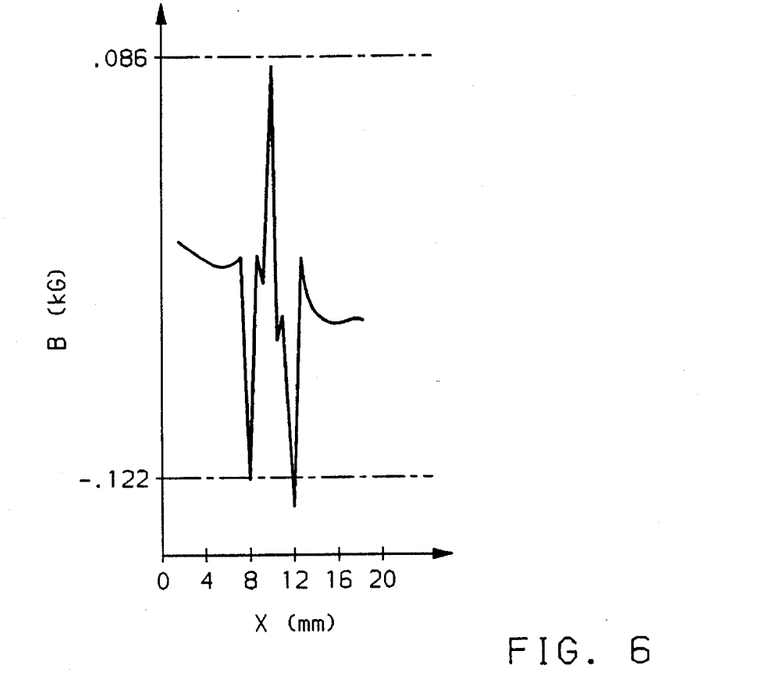
FIGS. 6 and 7 illustrate magnetic flux characteristics of the component slabs in FIG. 5.
Figure 7:
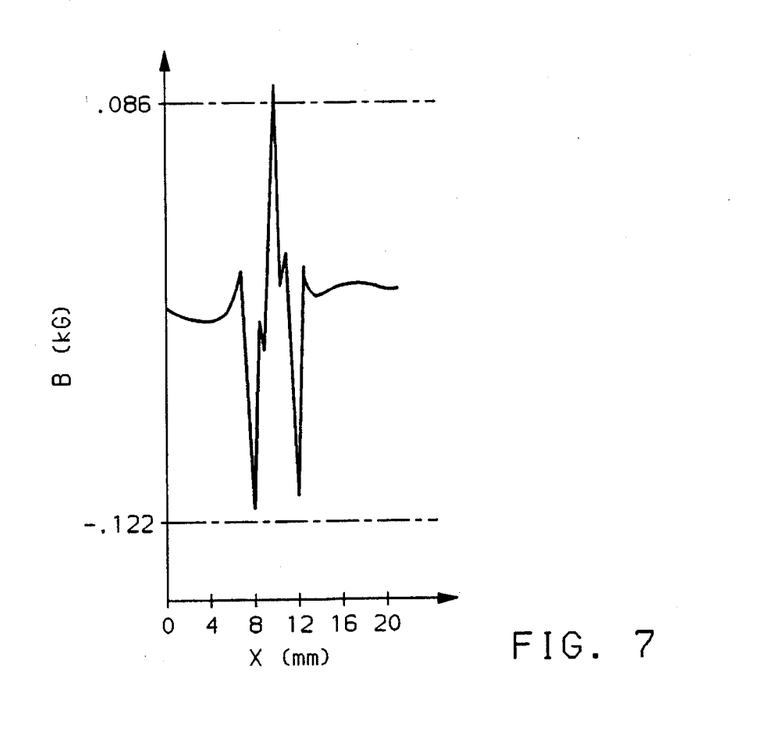

In one example, a series of North-South-North magnetic line segments were written with the above-described method on two 0.38 mm thick slabs of hot pressed $Nd_2Fe_{14}B$ (Magnequench MQ2 (TM) alloy). FIGS. 6 and 7 plot the magnetic field intensity 0.3 mm above the surface versus position for a scan across the written zones of each of the samples. FIGS. 6 and 7 show the magnetic flux density B falls as low as −0.122 kG (kilogauss) and rises as high as 0.086 kG.

Figure 8:
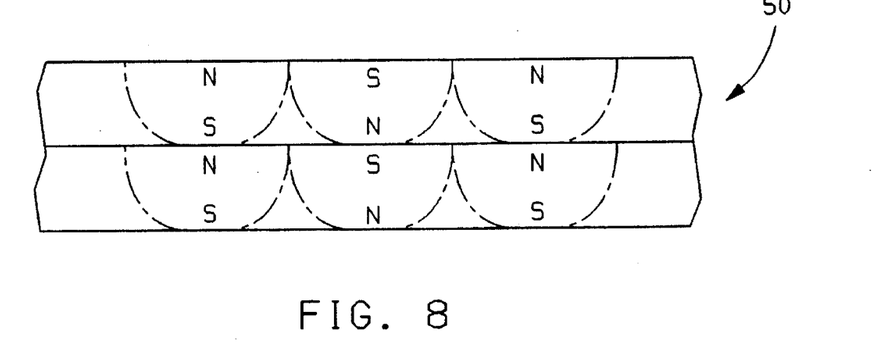
FIG. 8 illustrates the magnetic characteristics of a resultant laminated article according to this invention.
Figure 9:
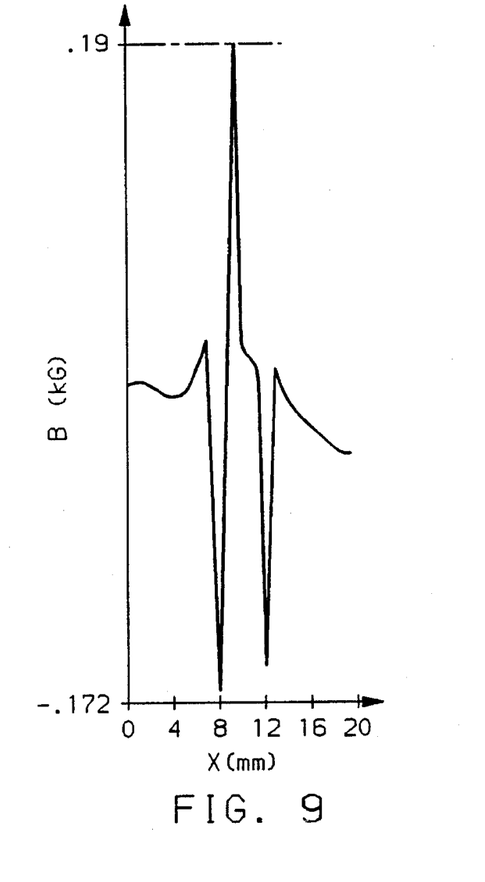
FIG. 9 illustrates a laminated article according to this invention.

The bodies were then laminated together using an adhesive (i.e., Ambroid™, manufactured by Ambroid Co., Lowell, Mass.) of a type readily available to those skilled in the art to form the resultant lamination stack 50 shown in FIG. 8. FIG. 9 plots the magnetic field intensity 0.3 mm above the surface of laminated article 50 shown in FIG. 8 and illustrates a dramatic increase in the magnetic field strength with no broadening of the signal or blurring of the magnetic information. The plot shows that the magnetic field strength B for the poles written falls as low as 0.172 and rises as high as 0.19 kG. The improved field strength of the three poles plotted in FIG. 9 can be further enhanced by including more than two slabs in a laminated article 50.

Figure 10:
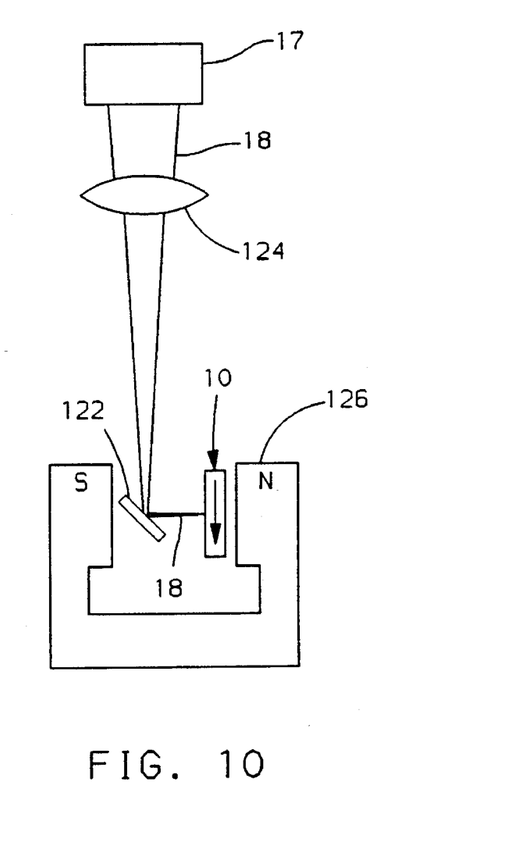
FIG. 10 illustrates an apparatus for implementation of the method of this invention.

Referring to FIG. 10, the apparatus shown is suitable for encoding slabs according to the above process. A source 17 of radiation, such as a laser generator, emits a beam 18 that is focused by lens 124 and deflected by mirror 122 onto permanent magnet body 10. The body 10 can be unmagnetized by heating to 350 degrees Celsius for 30 minutes in a vacuum furnace. The laser 17 operating in "all lines mode" scans the outer surface 12 of the sample 10 through a mirror 122. The lens 124 (i.e., 350 mm focal length) produces a slightly defocused beam 18 with a diameter of approximately 150 micrometers incident on the surface of the magnet material 10. A suitable power output for laser 17 is 6 watts as measured near the surface of sample 10.

A motorized translation stage (not shown) may be used to move the sample 10 in front of the stationary beam at a predetermined rate (i.e., 0.33 mm per second), which rate may be increased or decreased with varying conditions, laser strength, etc. A magnetic field (i.e., having a strength 3 kOe) produced by horseshoe magnet 126 is imposed on the body 10 during patterning.

Once body 10 is treated, body 10' is treated in a similar manner resulting in each body 10, 10' having identical tracks and spacing so that the heat affected zones may be aligned when the bodies are stacked or laminated together.

Figure 11:
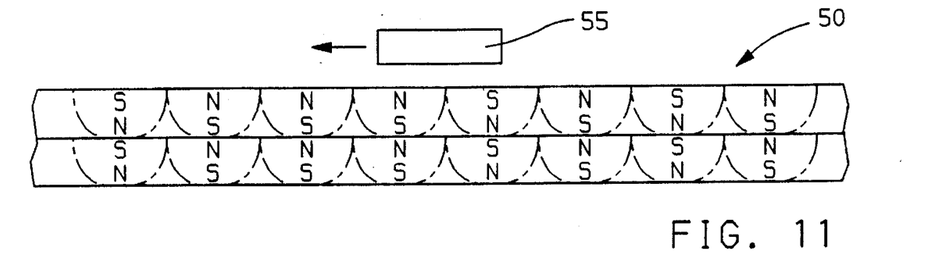
FIG. 11 is a schematic view of a patterned magnetic body according to the invention and a magnetic field sensor.

FIG. 11 illustrates a magnetic sensor 55 travelling over the various zones of the laminated stack encoded article 50 to measure or sense the poles, which may alternate or be of any configuration desired.

EXAMPLE 2

While the above example relates to a flat geometry, other geometries such as cylindrical geometries, may also be implemented. For example, first and second (and third, etc.) cylindrical bodies of successively decreasing radii, where the outer radius of each successive body is approximately that of the inner radius of the previous body, allows for a snug fitting of the cylindrical bodies within each other. Each cylindrical body is magnetized according to the apparatus shown in FIG. 12.

Figure 12:
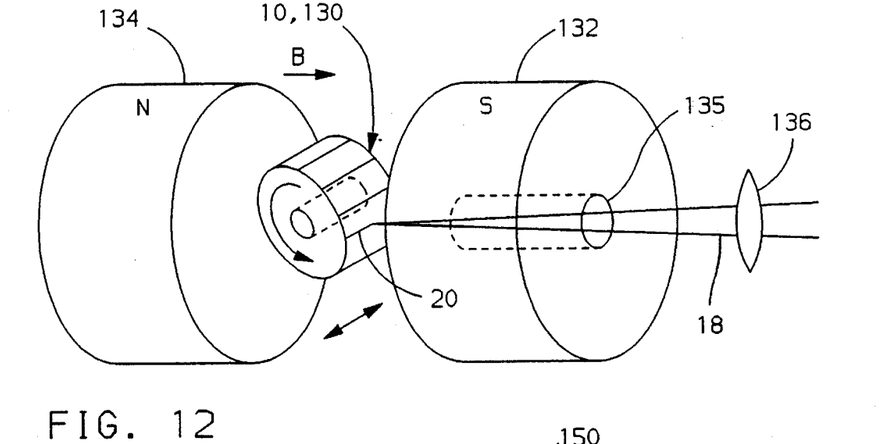
FIG. 12 illustrates a second example apparatus for implementation of the method of this invention.

In FIG. 12, the unmagnetized body 10 in the shape of a cylinder having a cylinder wall between approximately 0.25 and 1 mm thick is placed on a support and patterned with alternating poles in the apparatus shown. A pair of spaced electromagnets 132 and 134 produce a magnetizing field (i.e., 1 kOe) between them and are spaced to accommodate the unmagnetized sample 10 in the field. The electromagnet 132 has a central opening 135, which admits a laser beam to the sample 10. An argon laser may be used to create beam 18, which scans the surface of sample 10 with a 150 micrometer incident beam. The laser may be operated at a power of 6 watts measured near the substrate 130. A motorized translation stage (not shown) is used to axially move the substrate 130 in front of the stationary beam 18 at a desired rate (0.33 mm per second is suitable). When one track is magnetized, the substrate is indexed and the magnetic field is reversed to scan the next track and magnetize it in opposite polarity. In this manner, the substrate 130 is provided with alternating North and South polarity tracks.

A plurality of cylindrical substrates, of which one fits into another, are so magnetized and the substrates are then positioned, one within another, so that the magnetic tracks align to provide increased field strength at each pole. The substrates may be laminated or otherwise suitably attached together.

Figure 13:
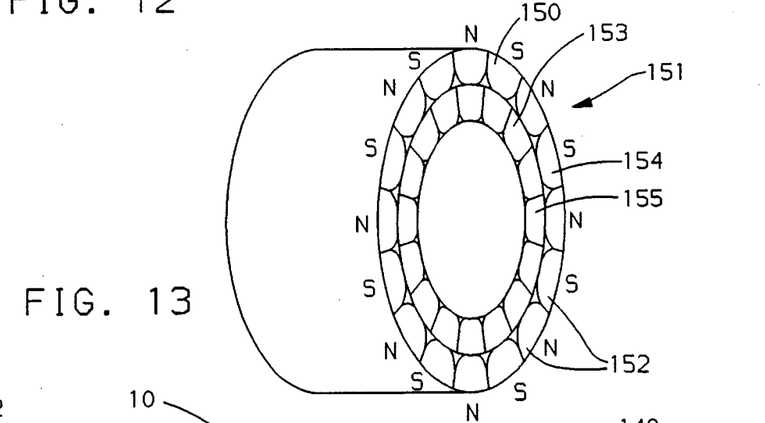
FIG. 13 is a schematic view of a cylindrical article according to this invention.

FIG. 13 illustrates a cylindrical magnetically encoded object comprising two cylindrical members, 150 and 153, having poles 152, each pole comprising heat affected zones 154 and 155, which are aligned as shown.

EXAMPLE 3

Figure 14:
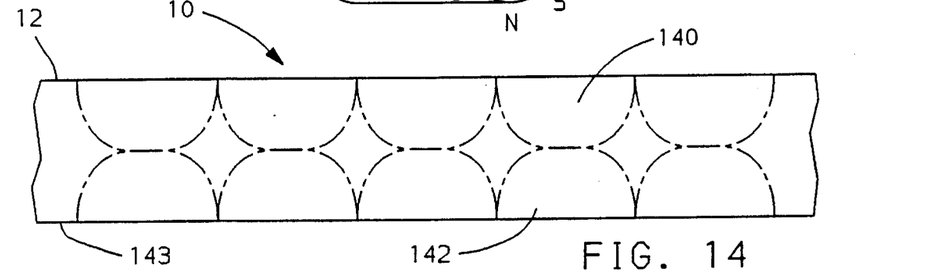
FIG. 14 is a schematic view of another example article according to this invention.

Referring to FIG. 14, in another embodiment of this invention, a flat or tubular body or body of other shape 10 has two sides of magnetic regions 140 and 142 to achieve the advantages of this invention in an alternative implementation. The body 10 is twice as thick as the bodies 10 described in EXAMPLE 1. According to the method of this invention, heat affected zones 140 are first implemented on a first side 12 in the manner described above and then corresponding zones 142 having alignments the same as those of zones 140 are created on the second side 143 of the body 10, exactly opposite the zones 140, so that each zone 140 aligns with a zone 142. In this manner, two zones 140 and 142 are aligned on a single substrate or body to provide twice the magnetic zone depth without increasing magnetic zone width, thus increasing magnetic strength without detracting from pole density or, on the alternative, allowing for increased pole density without detriment to pole field strength. With each heat affected zone extending half way through the base material, the resultant pole width to depth ratio~1.

Thus, the method of this invention for forming an article with a magnetic pattern on two sides to provide increased magnetic pole strength comprises the steps of: (a) directing energy in a pattern onto a first side of a base permanent magnet material to heat a volume of the material to a threshold temperature to lower the coercivity thereof, the base permanent magnet material having a permanent magnetic field flux density value in a range from zero flux to a flux density of 100% saturation of the base permanent magnet material; b) imposing a magnetic field on the heated volume greater or stronger than a coercivity of the heated volume, wherein the heated volume generates a flux density lower or higher than the base material; (c) and allowing the material to cool in the imposed field, whereby the heated and cooled volume has a magnetic characteristic sufficiently different from the base material and comprises at least one pole that is readily detectable by a magnetic sensor, (d) repeating steps (a), b) and (c) on a second side of the base permanent magnet material, wherein the pattern on the first side of the material corresponds to the pattern on the second side of the material, improving the detectability of at least said one pole by the magnetic sensor.

The resultant article of this example of the invention comprises a magnet comprising a body of permanent magnet material, said body consisting substantially of a substrate of permanent magnet material being magnetized substantially uniformly to a predetermined flux density value in a range from zero to 100% saturation of the permanent magnet material; said body also comprising a first pattern of one or more affected first volumes in a first surface of the body and a second pattern of one or more affected second volumes in a second surface of the body opposite the first surface, wherein at least one of each of the first and second volumes are directly opposite each other, wherein each affected first and second volumes has a magnetic flux density that varies from the substantially uniform predetermined flux density of said substrate and wherein said first and second volumes comprise magnetic poles aligned with each other.

The article shown in FIG. 14 may be made by encoding a first side according to the process steps set forth above and then encoding the second side in the similar steps to obtain the magnetized regions on the second side aligned with the regions on the first side. Or, alternatively, both sides may be encoded at once using a device such as that shown in FIG. 10 or in FIG. 12, adapted to apply a laser beam to both sides of the body 10 at the same time. Body 10 preferably has a thickness range of 0.5–1 mm when used with the implementation set forth in FIG. 14. However, increased thicknesses may be used.

EXAMPLE 4

Cylindrical bodies can be made in a similar manner as the flat body shown in FIG. 13, in which event the outer surface is treated to obtain the outer heat affected zones first and then the article is retained by the outer surface and a beam is deflected by a mirror to the inner surface to create inside heat affected zones aligned with the outside affected zones.

EXAMPLE 5

In the above-described examples of the bodies with the zones affected on two sides, the bodies are described as standing alone. However, such bodies may be laminated together in the manner of laminating the bodies described above in FIG. 5 to yet further improve field strength of each pole without sacrificing pole density.

Thus, the method of this invention for forming a laminated article with magnetic patterns on two sides of each lamination to provide increased magnetic pole strength comprises the steps of: (a) directing energy in a pattern onto a first side of a first base of permanent magnet material to heat a volume of the material to a threshold temperature to lower the coercivity thereof, the first base of permanent magnet material having a permanent magnetic field flux density value in a range from zero flux to a flux density of 100% saturation of the base permanent magnet material; (b) imposing a magnetic field on the heated volume greater or stronger than a coercivity of the heated volume, wherein the heated volume generates a flux density lower or higher than the base material; (c) and allowing the material to cool in the imposed field, whereby the heated and cooled volume has a magnetic characteristic sufficiently different from the base material and comprises at least one pole that is readily detectable by a magnetic sensor, (d) repeating steps (a), (b) and (c) on a second side of the first base of permanent magnet material, wherein the pattern on the first side of the first base permanent magnet material corresponds to the pattern on the second side of the first base permanent magnet material, (e) repeating steps (a), (b), (c) and (d) on a second base of permanent magnet material, and (f) stacking and attaching the two bases of permanent magnet materials so that at least one pole on the first base of permanent magnet material corresponds to and aligns with one pole on the second base of permanent magnet material, improving the detectability of said aligned poles by the magnetic sensor. Furthermore, steps (e) and (f) may be repeated for additional bases of the permanent magnet material to achieve a stack of three or more base permanent magnet materials with poles aligned to further improve detectability of the aligned poles by the magnetic sensor.

In all of the above described examples of the article of this invention, the magnetic poles are sensed proximate to a surface of the article and, whether the surface is substantially flat, curved or irregular in shape, at the point at the surface of the article where each magnetic pole is located, an imaginary plane exists tangential to the magnetic pole. Each magnetic pole according to this invention comprises two or more heat affected volumes aligned in a direction perpendicular to the imaginary plane tangential to the magnetic pole.

Thus, the article of this invention has the generic structure comprising: a body of permanent magnet material consisting substantially of a substrate of permanent magnet material being magnetized substantially uniformly to a predetermined flux density in a range from zero flux to 100% flux saturation of the permanent magnet material; the body also comprising a pattern of at least one affected first volume in a surface of the body, and at least one affected second volume aligned with one of the affected first volumes along a line substantially perpendicular to a plane tangential to said surface of the body, wherein each affected first and second volume has a magnetic flux density that varies from the substantially uniform predetermined flux density and wherein the aligned affected first and second volumes comprise a pole detectable by a magnetic sensor.

In the above-described examples of this invention, it is preferred that the depth of penetration for one-sided film is at least half way through the film and that the combined depth of penetration of the magnetic zones for two-sided film is at least half the thickness of the two sided film. Patterns created on the articles above may be ordered in any suitable pattern or may have no apparent order, as a designer desires.

Each of the patterns shown and described above are able to be sensed by a magnetoresistive sensor. Other types of sensors for sensing magnetic fields are also suitable.

While it is preferred to heat the selected regions with a laser beam, radiant heating by other means as well as surface contact heating are alternatives.

While the invention has been described in terms of a few specific examples, it will be appreciated that others could readily be adopted by one skilled in the art. Accordingly, the scope of the invention is to be considered limited only by the following claims.

We claim:

1. A method for forming an article with a magnetic pattern thereon, comprising the steps of:
   (a) directing energy in a pattern onto a first base of permanent magnet material having a first volume to heat a plurality of at least two second volumes of the first base of permanent magnet material to a threshold temperature to lower a coercivity thereof, the first base of permanent magnet material having a permanent magnetic field flux density value in a range from zero flux to a flux density of 100% saturation of the base permanent magnet material;
   (b) imposing a magnetic field on the heated second volumes greater than the coercivity of the heated second volumes, wherein the second volumes are treated and the first volume remains untreated, wherein the treated second volumes comprise a treated pattern on the untreated first volume that generates a flux density lower or higher than that of the untreated first volume of the first base of permanent magnet material;
   (c) and allowing the heated second volumes to cool in the imposed field, wherein the treated pattern has a magnetic characteristic sufficiently different from the first volume of the first base of permanent magnet material that the treated pattern comprises at least two poles that are readily detected by a magnetic sensor;
   (d) repeating steps (a), (b) and (c) on a second base of permanent magnet material; and
   (e) stacking and attaching the two bases of permanent magnet material so that the treated pattern of the first base of permanent magnet material aligns with the treated pattern of the second base of permanent magnet material, wherein the at least two poles of the first base of permanent magnet material align and act together with the at least two poles of the second base of permanent magnet material, wherein the detectability of said two poles of said treated pattern of the first base of permanent magnet material by said magnetic sensor is increased without decreasing a spatial density of said two poles of said treated pattern of the first base of permanent magnet material.

2. The method of claim 1, also comprising the step of (f) repeating steps (d) and (e) for additional bases of permanent magnet material to form an article comprising a stack of three or more bases of permanent magnet material.

3. The method of claim 1 wherein the base of permanent magnet material has a flux density of substantially 0.

4. The method of claim 1, wherein the base of permanent magnet material is magnetically saturated.

5. The method of claim 1, wherein the base of permanent magnet material has a flux density between 0 and 100% saturation.

6. The method of claim 1 wherein the two poles of the first base of permanent magnet material and the two poles of the second base of permanent magnet material have magnetic vectors that are coplanar, collinear, and in the same direction.

7. The method of claim 1, wherein the first and second bases are laminated together.

8. A method for forming an article with a magnetic pattern on two sides to provide increased magnetic pole strength comprises the steps of:
   (a) directing energy in a pattern onto a first side of a base permanent magnet material having a first volume to heat a plurality of at least two second volumes of the first base of permanent magnet material to a threshold temperature to lower a coercivity thereof, the base of permanent magnet material having a permanent magnetic field flux density value in a range from zero flux to a flux density of 100% saturation of the base permanent magnet material;
   (b) imposing a magnetic field on the heated second volumes greater than the coercivity of the heated second volumes, wherein the second volumes are treated and the first volume remains untreated, wherein the treated second volumes comprise a treated pattern on the untreated first volume that generates a flux density lower or higher than that of the untreated first volume of the base permanent magnet material;
   (c) allowing the treated pattern to cool in the imposed field, wherein the treated pattern has a magnetic characteristic sufficiently different from the first volume of the base permanent magnet material that the treated pattern comprises at least two poles that are readily detectable by a magnetic sensor;
   (d) repeating steps (a), (b) and (c) on a second side of the base permanent magnet material, wherein the treated pattern on the first side of the base permanent magnet material corresponds to the treated pattern on the second side of the base permanent magnet material, wherein the at least two poles on the first side align and act together with the at least two poles on the second side, wherein the detectability of said at least two poles on the first side by said magnetic sensor is increased without decreasing a spatial density of said at least two poles on the first side.

9. A method of magnetically encoding an article comprising the steps of:
   (a) directing energy in a pattern onto a first side of a first base of permanent magnet material having a first volume to heat a plurality of at least two second volumes of the first base of permanent magnet material to a threshold temperature to lower a coercivity thereof, the first base of permanent magnet material having a permanent magnetic field flux density value in a range from zero flux to a flux density of 100% saturation of the first base of permanent magnet material;
   (b) imposing a magnetic field on the heated second volumes greater than the coercivity of the heated second volumes, wherein the second volumes are treated and the first volume remains untreated, wherein the treated second volumes comprise a treated pattern on the untreated first volume that generates a flux density lower or higher than that of the untreated first volume of the base permanent magnet material;

(c) and allowing the treated pattern to cool in the imposed field, wherein the treated pattern has a magnetic characteristic sufficiently different from the first volume of the base permanent magnet material that the treated pattern comprises at least two poles that are readily detectable by a magnetic sensor;

(d) repeating steps (a), (b) and (c) on a second side of the first base of permanent magnet material, wherein the treated pattern on the first side corresponds to the treated pattern on the second side;

(e) repeating steps (a)–(d) on a second base of permanent magnet material;

(f) stacking and fastening the first and second bases of permanent magnet material together wherein the at least two poles on the first side of the first base of permanent magnet material align and act together with the at least two poles on the second side of the first base of permanent magnet material, the at least two poles on the first side of the second base of permanent magnet material and the at least two poles on the second side of the second base of permanent magnet material, wherein the detectability of the at least two poles on the first side of the first base of permanent magnet material by said magnetic sensor is increased without decreasing a spatial density of the at least two poles on the first side of the first base of permanent magnet material.

10. The method for forming an article with a magnetic pattern thereon set forth in claim 1, wherein the first and second bases of permanent magnet material have a thickness ranging between 0.25 and 1 mm.

11. The method for forming an article with a magnetic pattern thereon set forth in claim 8, wherein the base of permanent magnet material has a thickness ranging between 0.25 and 1 mm.

12. The method for forming an article with a magnetic pattern thereon set forth in claim 9, wherein the first and second bases of permanent magnet material have a thickness ranging between 0.25 and 1 mm.

* * * * *